L. C. THOMAS.
GOPHER TRAP.
APPLICATION FILED MAY 28, 1919.
1,363,626.
Patented Dec. 28, 1920.
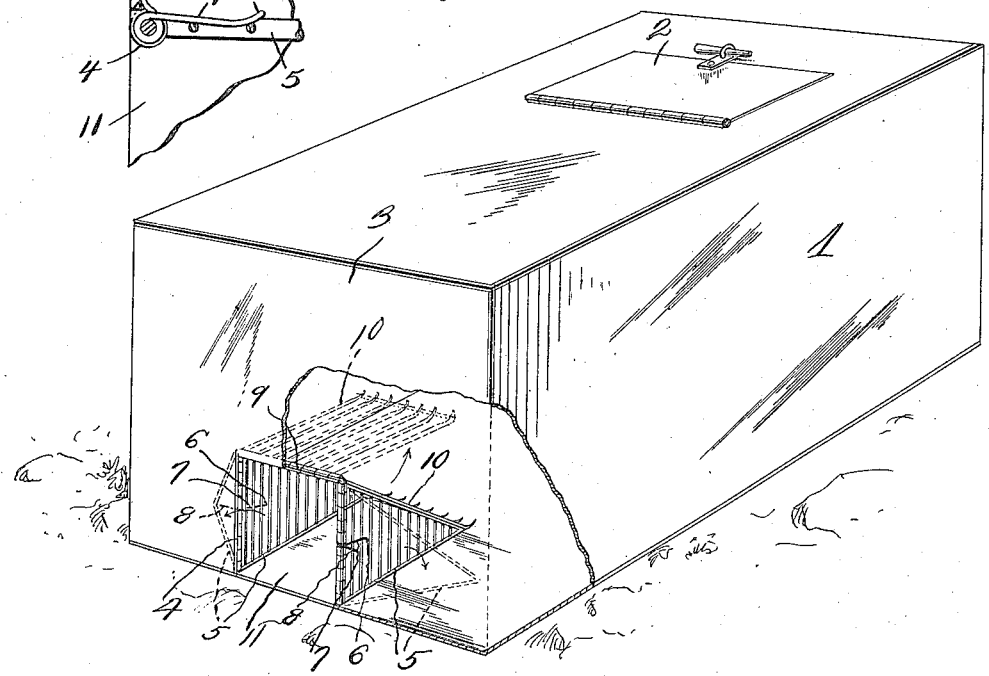
Inventor
L. C. Thomas
By
D. Swift
Attorney

UNITED STATES PATENT OFFICE.

LEE C. THOMAS, OF NIHILL, MONTANA.

GOPHER-TRAP.

1,363,626.  Specification of Letters Patent.  Patented Dec. 28, 1920.

Application filed May 28, 1919. Serial No. 300,242.

*To all whom it may concern:*

Be it known that I, LEE COLLIN THOMAS, a citizen of the United States, residing at Nihill, in the county of Wheatland, State of Montana, have invented a new and useful Gopher-Trap; and I do hereby declare the following to be a full, clear, and exact description of the invention, such as will enable others skilled in the art to which it appertains to make and use the same.

The invention relates to animal traps and particularly to gopher traps and has for its object to provide an entrance for a trap of this character wherein the animal comes in contact with vertically and horizontally pivoted members which members will be forced to one side and the animal allowed to pass into the body of the trap, the horizontally pivoted member returning to normal by gravity and the vertically pivoted members being returned to normal position by springs.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the gopher trap showing a part thereof broken away around the entrance to said trap.

Fig. 2 is an enlarged detail sectional view through the entrance to the trap.

Fig. 3 is a detail sectional view through the hinging point of one of the vertically pivoted side members showing the spring for actuating the same.

Referring to the drawings, the numeral 1 designates the body of the trap, which body may be of any shape or configuration, there being a closure 2 over an opening in the body member, thereby providing access to the body member for the removal of the animal from the same.

The end 3 of the body member is provided with an opening 4 and pivoted to the vertical sides of the opening 4 are triangular shaped members 5, which members are disposed against the ends 6 of springs 7, the arms 8 of said springs being adapted to engage the inner face of the wall of the end 3. However, these springs do not tensionally engage the sides of the triangular members 5 until the same are moved to their outward positions as shown in dotted lines in Fig. 1, at which time the springs 6 will be compressed in the directions of the members 8 thereof, said springs being adapted to return the pivoted sides to their normal positions after the animal has passed into the trap.

Horizontally pivoted as at 9 to the upper edge of the opening 4 is a rectangular frame 10, which rectangular frame 10 normally rests upon the upper edges of the vertically pivoted members 5. However, when an animal enters the entrance 11 and if he should continue into the trap without turning to either side the pivoted member will be raised by the animal and when he has passed beyond the end thereof the same will drop back into normal position by gravity.

It will be seen that a trap has been provided which will be simple of construction and one which may be constructed at a small price. It will also be seen that when the animal or gopher enters the trap that if he should turn to either side he will be able to gain entrance to the trap for the reason that the side members are pivoted and after he has entered the trap the side members will be returned to normal position by the springs 7, also that an animal will be trapped if he continues into the trap without turning to either side.

The invention having been set forth what is claimed as new and useful is:—

1. A trap entrance comprising a rectangular opening, triangular members having their vertically disposed bases pivotally secured to the vertical sides of said rectangular opening and their apexes disposed inwardly, said triangular shaped members being normally in parallel relation to each other and a rectangular member having one of its ends pivotally secured to the upper horizontal edge of said rectangular opening and its free edge extending beyond the apex ends of the triangular pivoted members and engaging the bottom of the trap.

2. A trap entrance comprising a rectangular opening, triangular members having their vertically disposed bases pivotally secured to the vertical sides of said rectangular opening and their apexes disposed within the trap, said triangular shaped members being normally in parallel relation to each other, springs engaging said triangular shaped members and adapted to be compressed by said members when the members are forced outwardly, said spring forming means for returning said triangular members to normal position after the animal has passed into the trap, a rectangular member disposed over the triangular members, one end of said rectangular member being pivoted to the horizontal edge of the opening, the free end of said rectangular member being so disposed as to extend beyond the apexes of the triangular members, said rectangular member being gravity actuated to a closed position after the animal has passed into the trap and prongs carried by the free marginal edge of said rectangular member for preventing the animal from raising the same and escaping from the trap.

In testimony whereof I have signed my name to this specification in the presence of two subscribing witnesses.

LEE C. THOMAS

Witnesses:
  N. O. HUSBAND,
  J. I. HUDSON.